(12) United States Patent
Marcott

(10) Patent No.: US 7,600,954 B2
(45) Date of Patent: Oct. 13, 2009

(54) LOAD SECURING DEVICE

(76) Inventor: Dan Marcott, 33030 NE. 138th St., Duvall, WA (US) 98019

(*) Notice: Subject to any disclaimer, the term of this patent is extended or adjusted under 35 U.S.C. 154(b) by 0 days.

(21) Appl. No.: 11/393,964

(22) Filed: Mar. 30, 2006

(65) Prior Publication Data

US 2007/0231102 A1 Oct. 4, 2007

(51) Int. Cl.
B60P 7/08 (2006.01)

(52) U.S. Cl. .................. 410/109; 410/97; 410/102; 410/106; 410/113; 410/114; 410/115; 410/143

(58) Field of Classification Search ............... 410/10, 410/11, 23, 96, 97, 102, 106, 108, 109, 112–116, 410/143, 150, 151; 224/403, 534, 568; 24/265 CD, 24/115 K; 248/499
See application file for complete search history.

(56) References Cited

U.S. PATENT DOCUMENTS

| 3,643,973 | A | | 2/1972 | Bott |
|---|---|---|---|---|
| 4,396,324 | A | | 8/1983 | Ellis |
| 4,850,770 | A | | 7/1989 | Millar, Jr. |
| 4,969,784 | A | | 11/1990 | Yanke |
| 5,494,388 | A | | 2/1996 | Stevens |
| 5,533,848 | A | | 7/1996 | Davis |
| 5,560,576 | A | | 10/1996 | Cargill |
| 5,688,087 | A | * | 11/1997 | Stapleton et al. ............ 410/150 |
| 6,039,520 | A | * | 3/2000 | Cheng ........................ 410/106 |
| 6,050,763 | A | | 4/2000 | Swailes |
| 6,350,089 | B1 | | 2/2002 | Tekavec |
| 6,565,300 | B2 | | 5/2003 | Herring |
| 6,821,067 | B1 | | 11/2004 | Von Loehr |
| 6,887,021 | B1 | | 5/2005 | Herring |
| 2002/0012576 | A1 | | 1/2002 | Anderson |

* cited by examiner

Primary Examiner—Stephen Gordon
(74) Attorney, Agent, or Firm—Christensen O'Connor Johnson Kindness PLLC

(57) ABSTRACT

A load securing device (20) for a pick-up truck (100) cargo bed (102) having at least one sidewall (104), the at least one sidewall including a cap portion (106) having a top portion (110) and a vertical portion (112) is provided. The load securing device generally includes a tubular member (22) having a first surface (30) and a second surface (32), the tubular member being adapted to be coupled to the cap portion in a manner that positions the first surface of the tubular member adjacent one of either the top portion or the vertical portion of the cap portion. When coupled to the cap portion, the tubular member is substantially visually obscured by the cap portion. The load securing device further includes at least one attachment member (24) extending from the second surface of the tubular member to provide a tie-down anchor.

13 Claims, 6 Drawing Sheets

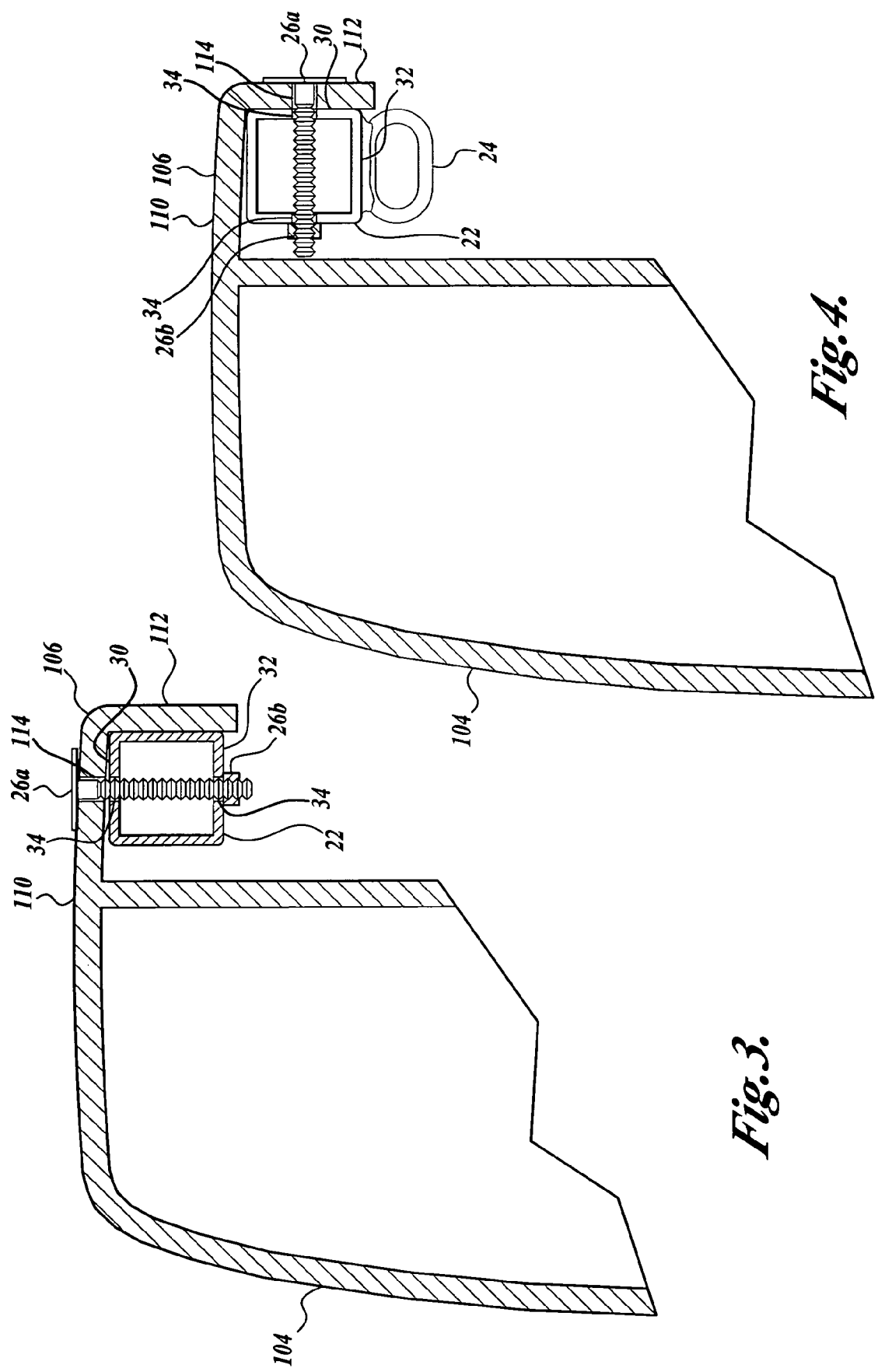

LOAD SECURING DEVICE

TECHNICAL FIELD

Embodiments of the present disclosure relate generally to load securing devices, and more specifically, to load securing devices for pick-up truck cargo beds.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

In accordance with one embodiment of the present disclosure, a load securing device for a pick-up truck cargo bed is provided, the cargo bed having at least one sidewall which includes a cap portion having a top portion and a vertical portion. The load securing device includes a tubular member having a first surface and a second surface. The tubular member is adapted to be coupled to the cap portion in a manner that positions the first surface of the tubular member adjacent one of either the top portion or the vertical portion of the cap portion, wherein the tubular member is substantially visually obscured by the cap portion when the tubular member is coupled to the cap portion. The load securing device further includes at least one attachment member extending from the second surface of the tubular member to provide a tie-down anchor.

In accordance with another embodiment of the present disclosure, a load securing device for a pick-up truck cargo bed is provided. The load securing device includes a tubular member sized and configured to fit within a portion of the cap portion. Further, the load securing device includes a plurality of attachment members extending from the second surface of the tubular member and providing a plurality of tie-down anchors.

In accordance with still other embodiments of the present disclosure, a method of attaching a load securing device to a pick-up truck cargo bed is provided, the cargo bed having at least one sidewall which includes a cap portion having a top portion and a vertical portion. The method of attaching the load securing device includes obtaining a load securing device. The method further includes positioning the load securing device such that the first surface of the tubular member is adjacent an inner surface of either the top portion or the vertical portion of the cap portion and such that the tubular member is substantially visually obscured by the vertical portion of the cap portion. In addition, the method includes coupling the tubular member to the cap portion.

DESCRIPTION OF THE DRAWINGS

The foregoing aspects and many of the attendant advantages of the present disclosure will become more readily appreciated by reference to the following detailed description, when taken in conjunction with the accompanying drawings, wherein:

FIG. 3 is a partial cross-sectional end view of the load securing device of FIG. 1 in a first configuration;

FIG. 4 is a partial cross-sectional end view of the load securing device of FIG. 1 in a second configuration;

DETAILED DESCRIPTION

Figure 1:
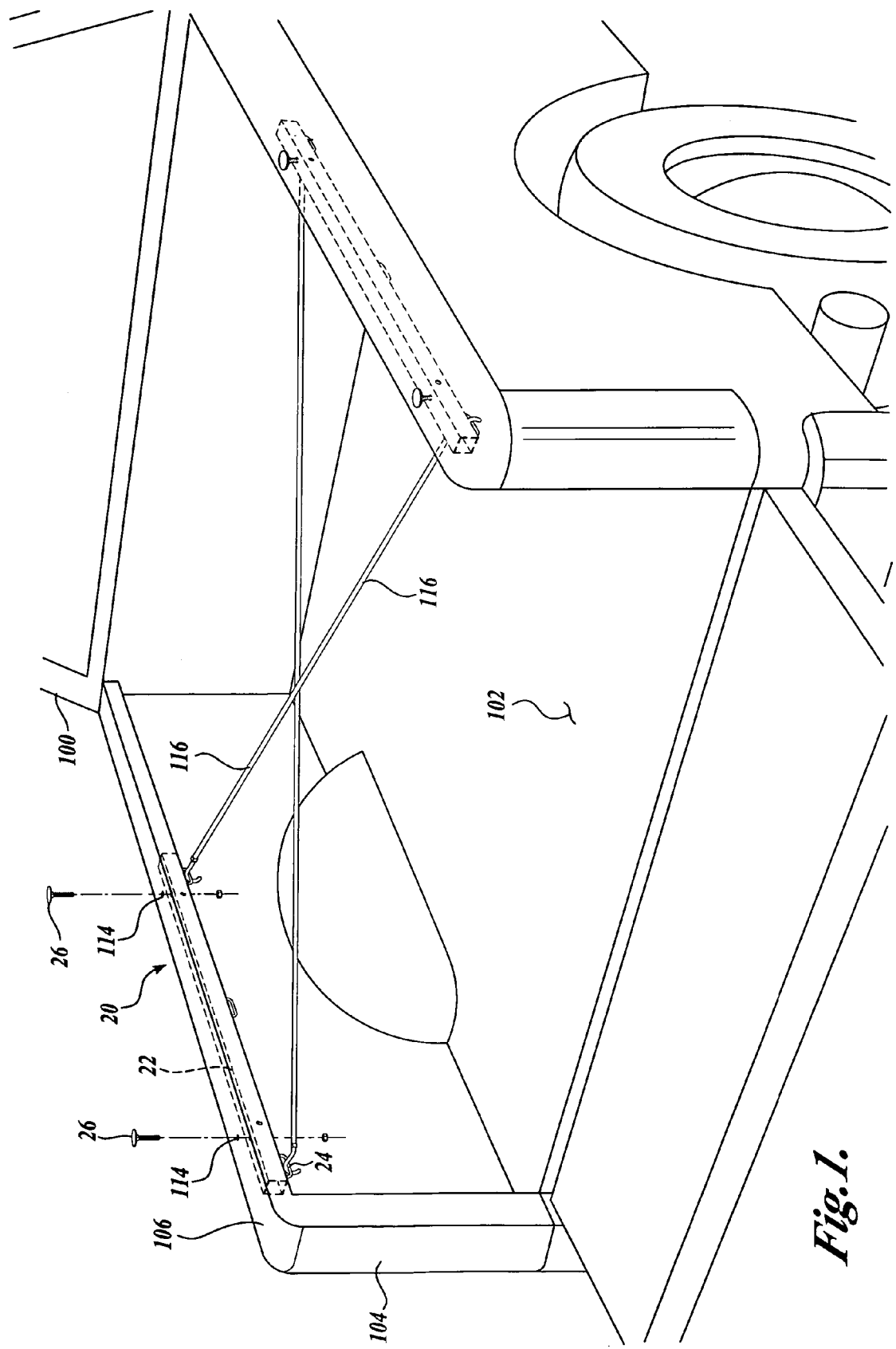
FIG. 1 is a perspective view of a pair of load securing devices coupled to portions of a pick-up truck cargo bed, in accordance with one embodiment of the present disclosure.

As shown in enclosed FIGS. 1-7, embodiments of the present disclosure are directed to a load securing device 20 for a pick-up truck 100 cargo bed 102 having at least one sidewall 104. The load securing device 20 suitably attaches to the sidewall 104 underneath a cap portion 106 of the sidewall 104. As best seen in FIGS. 3 and 4, the device 20 is designed and configured to be coupled to the sidewall 104 in a manner that positions a side of the device 20 adjacent or abutting an inner surface of either a top portion 110 (see FIG. 3) or a vertical portion 112 (see FIG. 4) of the cap portion 106. One or more devices 20 can be used to secure loads being transported on a pick-up truck 100 cargo bed 102.

By attaching the device 20 to the truck sidewall 104 underneath the cap portion 106, the device 20 is more aesthetically pleasing than other load securing devices because the device is substantially visually obscured or hidden from view underneath the cap portion 106. In addition, the device 20 is substantially protected by the cap portion 106, preventing damage to the device 20 or damage to a load by the device 20 (such as by snagging on a load).

The device 20 can be further designed and configured to be of a suitable length corresponding to the length of the cap portion 106 of the sidewall 104. In this regard, the device 20 be designed and configured to span the entire length of the cap portion 106 of the sidewall 104, or only a portion of the length of the cap portion 106 of the sidewall 104. In addition, and as discussed in detail below, multiple load securing devices 20 can be used in concert to span a certain length underneath the cap portion 106 of the sidewall 104.

Figure 2:
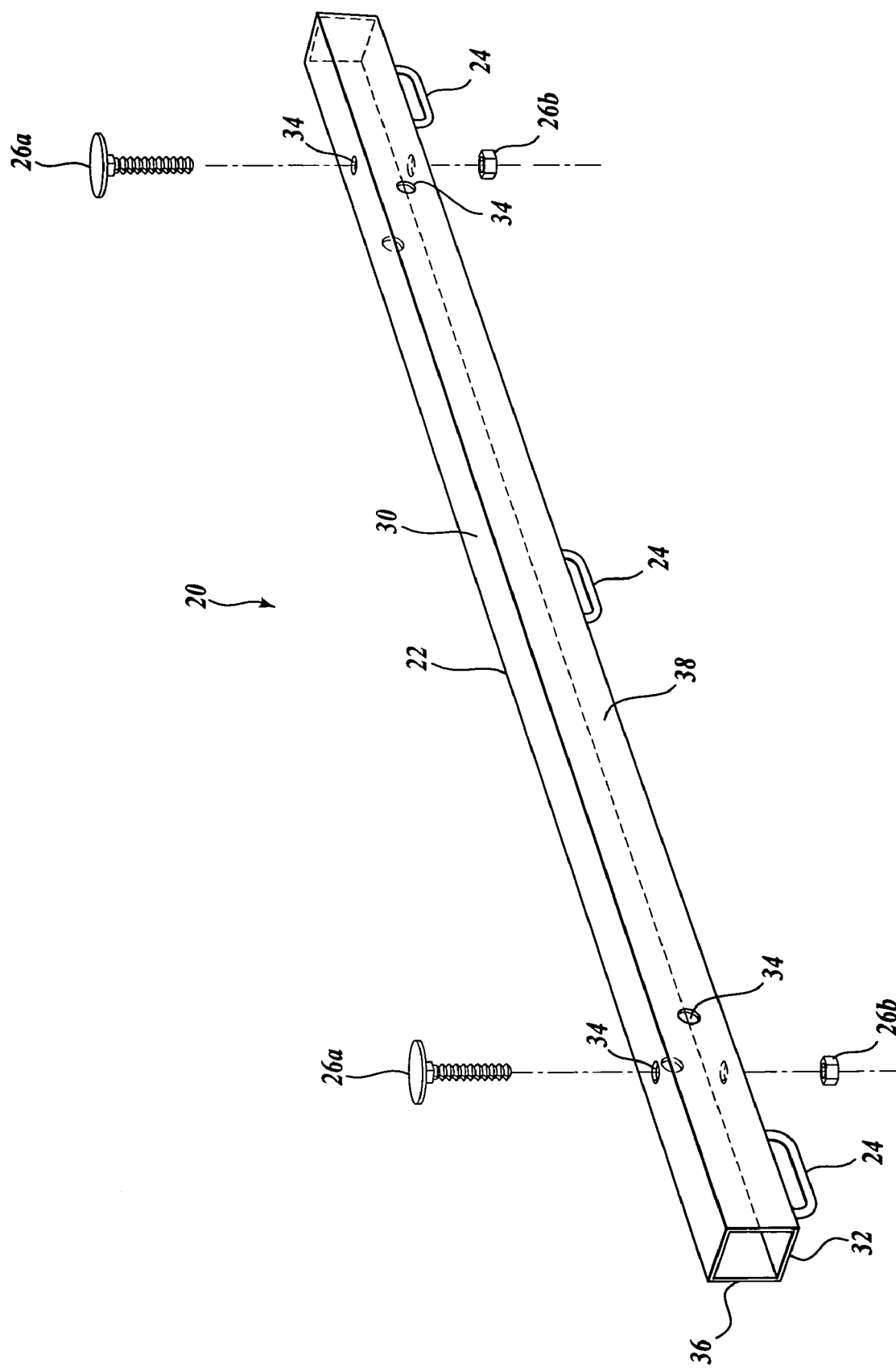
FIG. 2 is a perspective view of the load securing device of FIG. 1.
Figure 5:
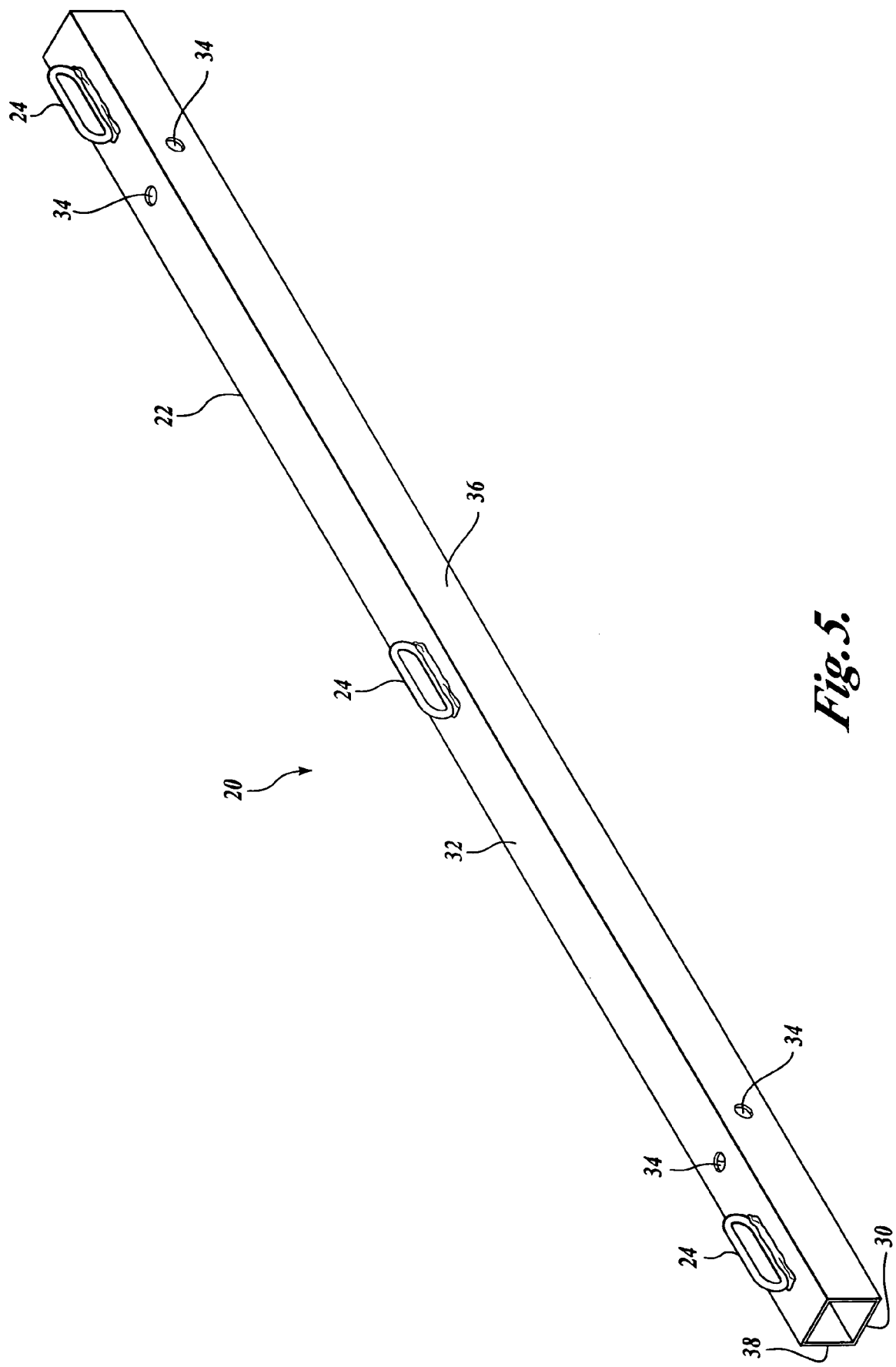
FIG. 5 is a perspective bottom view of the load securing device of FIG. 1, in accordance with a first non-limiting example.
Figure 6:
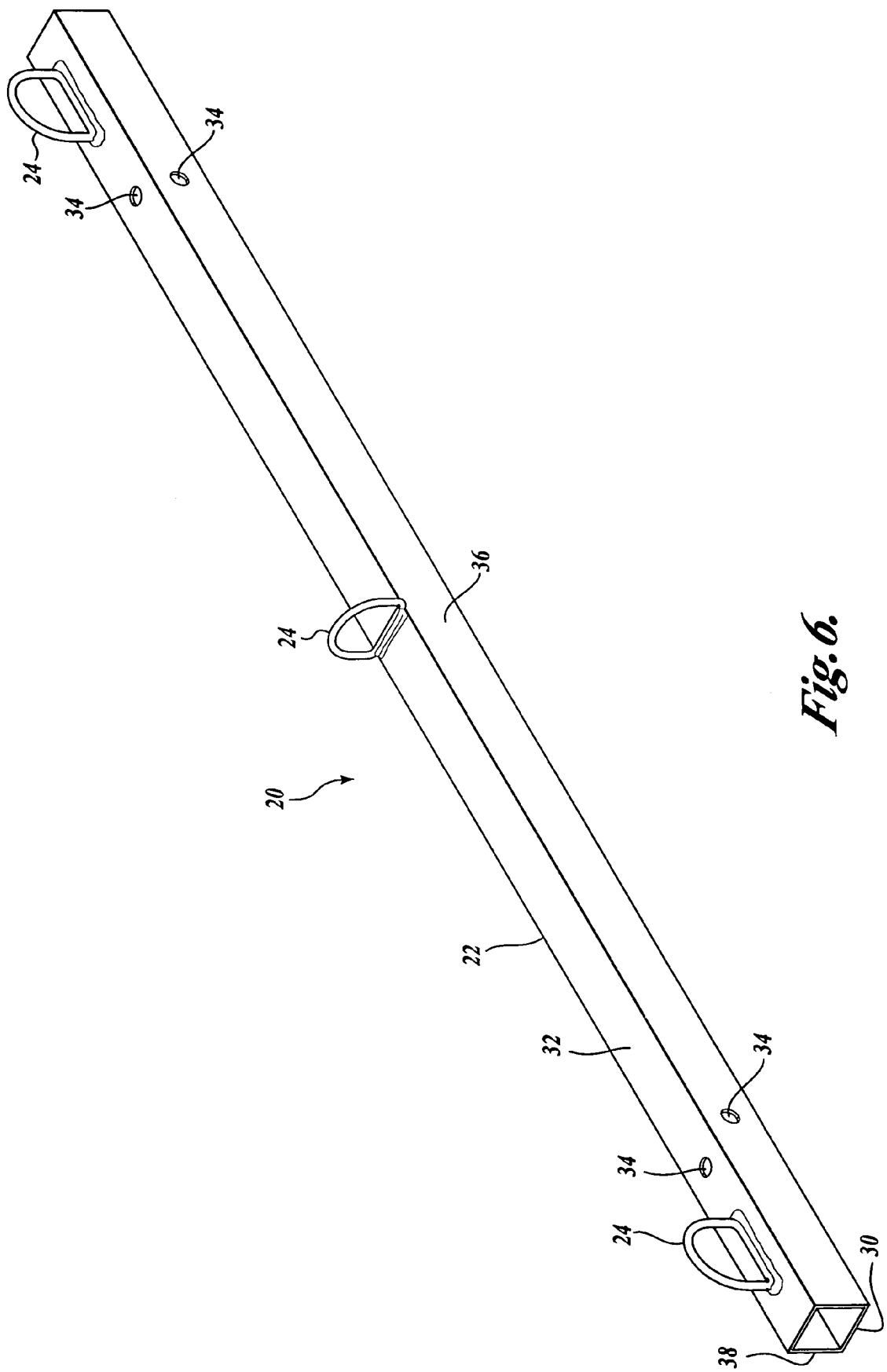
FIG. 6 is a perspective bottom view of the load securing device of FIG. 1, in accordance with a second non-limiting example.
Figure 7:
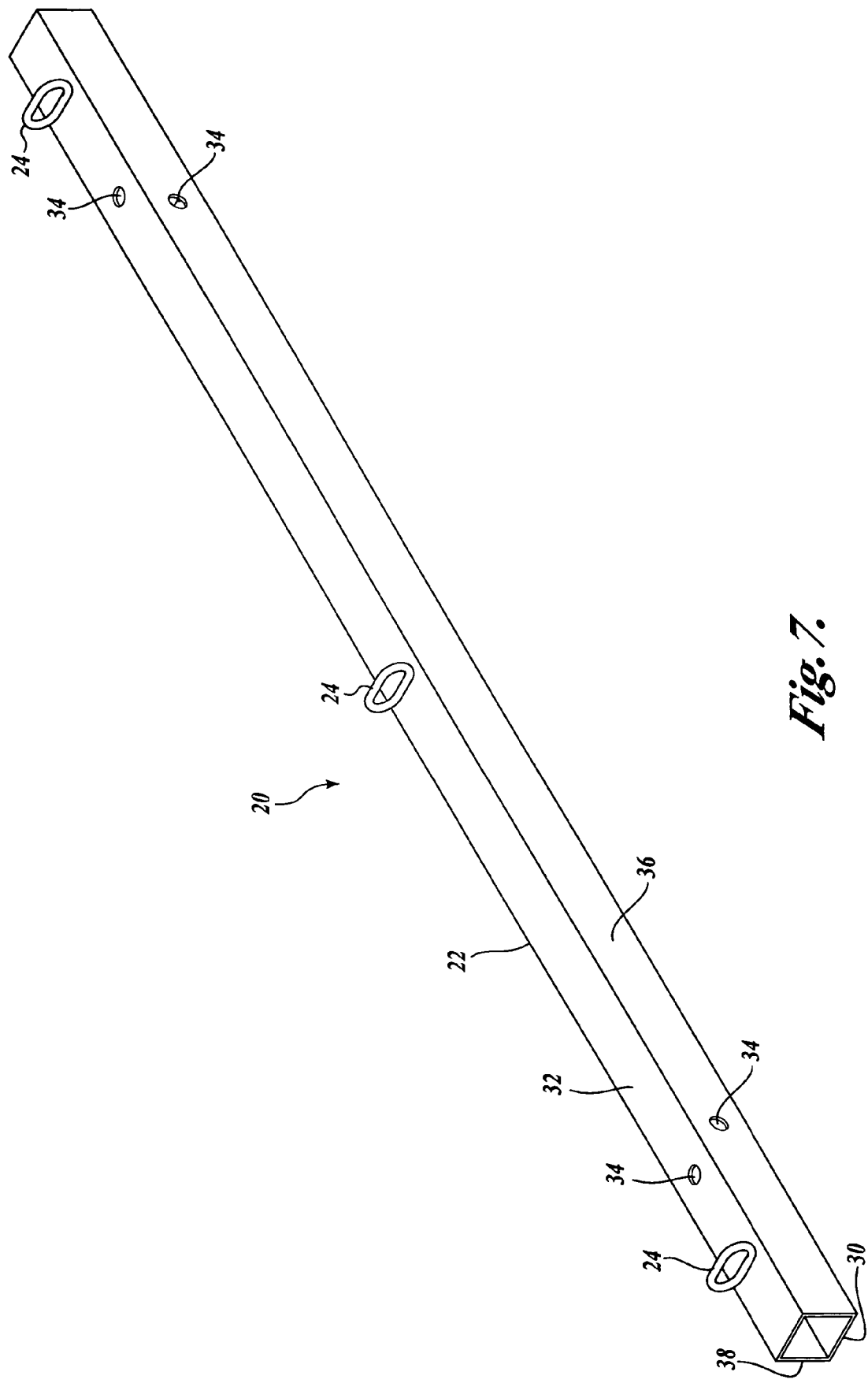
FIG. 7 is a perspective bottom view of the load securing device of FIG. 1, in accordance with a third non-limiting example.

Referring to FIGS. 1 and 2, the load securing device 20 includes a tubular member 22 and a plurality of attachment members or rings 24. The device 20 further includes at least one fastener 26a extending at least partially through the tubular member 22 to couple the tubular member 22 to the cap portion 106 of the sidewall 104.

The tubular member 22 has at least two surfaces, including a first surface 30 and a second surface 32. The tubular member 22 is designed and configured to be adapted to couple to the inner cap portion 106 of the sidewall 104 in a manner that positions the first surface 30 adjacent or abutting an inner surface of either a top portion 110 or a vertical portion 112 of the cap portion 106. In this orientation, the tubular member 22 is substantially visually obscured by the cap portion 106 of the sidewall 104. In one embodiment of the present disclosure, the tubular member is designed and configured to have an interference fit within the inner cap portion of the sidewall (not shown).

As will be discussed in detail below, the plurality of attachment members 24 extend from the second surface 32 of the tubular member 22. As best seen in FIGS. 3 and 4, the second surface 32 of the tubular member 22 may be opposite (see FIG. 3) or adjacent (see FIG. 4) the first surface 30, or in other suitable spatial relationships to the first surface besides being opposite or adjacent the first surface.

It should be appreciated that the tubular member 22 is not limited to having two surfaces 30 and 32, and may include additional surfaces. In the illustrated embodiments of FIGS. 1-7, the tubular member 22 has a square cross-section and therefore includes four surfaces. In other embodiments, the tubular member may have any polygonal cross-section including any number of surfaces, including both flat and contoured surfaces. As non-limiting examples, the tubular member may have a rounded, semi-rounded, triangular, hexagonal, symmetrical, non-symmetrical, or any suitable other cross-section having at least two surfaces.

It should further be appreciated that the tubular member 22 may be of hollow or solid construction. In addition, the tubular member 22 may be constructed from any suitable materials known and used in the art, including, but not limited to, metals, metal alloys, plastics, woods, or any combination thereof.

The tubular member 22 further includes at least one thru-hole 34 extending through at least one surface of the tubular member 22. In the illustrated embodiment, the tubular member 22 includes two thru-holes 34 extending through both the first and second surfaces 30 and 32 and two additional thru-holes 34 extending through third and fourth surfaces 36 and 38. Although the illustrated embodiment includes four thru-holes 34 each extending through two of four surfaces, it should be appreciated that any number of thru-holes 34 extending through either one surface or two surfaces is within the scope of the present disclosure.

The tubular member 22 thru-holes 34 are designed and configured to receive fasteners 26a for vertical (see FIG. 3) or horizontal (see FIG. 4) attachment to the sidewall 104 underneath the cap portion 106 (as discussed in detail below). The tubular member 22 thru-holes 34 are further adequately spaced from one another such that the fasteners 26a can adequately couple the tubular member 22 to the cap portion 106 of the sidewall 104 to support the device 20 in the attached position, as well as any additional load on the device 20. As best seen in FIGS. 1, 3, and 4, the tubular member 22 thru-holes 34 are configured to be aligned with sidewall 104 thru-holes 114 on either the top portion 110 or the vertical portion 112 of the cap portion 106 of the truck sidewall 104.

The fasteners 26a will now be discussed in greater detail. As discussed briefly above, the device 20 includes at least one fastener 26a extending at least partially through the tubular member 22. In the illustrated embodiment of FIGS. 1 and 2, the device 20 includes two fasteners 26a. As best seen in FIG. 2, the fasteners 26a are suitably elevator bolts and include nuts 26b. The fastener 26a is received through the sidewall 104 thru-hole 114 and both the first and second surfaces 30 and 32 of the tubular member 22 at thru-hole 34. Nut 26b is secured to fastener 26a to secure the device 20 to the sidewall 104.

Although the fasteners 26a and 26b are elevator bolts and nuts in the illustrated embodiment, it should be appreciated that other suitable fasteners know to those of ordinary skill in the art also within the scope of the present disclosure. As non-limiting examples, other fasteners may include other suitable bolts and nuts, nut-less bolts threaded directly into threaded thru-holes within the first surface of the tubular member, expansion bolts, or any other suitable fasteners know to those of ordinary skill in the art.

The attachment members 24 extending from the second surface 32 of the tubular member 22 will now be described in greater detail. The attachment members 24 may be any of a variety of attachment mechanisms known and used in the art, or any combination thereof. As non-limiting examples, referring to FIGS. 5-7, the attachment members 24 may be chain links (see FIG. 5), D-rings (see FIG. 6), or hooks (see FIG. 7). These attachment members 24 are welded, adhered, fastened, or otherwise attached to the second surface 32 of the tubular member 22. It should be appreciated that the attachment members 24 can be adjustably attached to the tubular member 22, such that the attachment members 24 are selectively moveable along the tubular member 22 and removable from the tubular member 22 for a variety of attachment member placements depending on user preference. It should further be appreciated that any suitable number of attachment members may extend from the second surface 32 of the tubular member 22.

In addition, the attachment members 24 may be located on the tubular member 22 in any of a variety of advantageous orientations. As non-limiting examples, the attachment members 24 may be centered on the second surface 32 parallel to the longitudinal direction of the tubular member 22 (see FIG. 5), perpendicular to the longitudinal direction of the tubular member 22 see FIG. 7), in a diagonal orientation, any other suitable orientation, or in any combination of orientations (see, e.g., FIG. 6). The attachment members 24 provide a plurality of tie-down anchors.

A method of attaching a load securing device 20 to a pick-up truck 100 cargo bed 102 sidewall 104 having a cap portion 106 having a top portion 110 and a vertical portion 112 will now be described. The method of attaching the load securing device 20 includes obtaining a device 20 as described in detail above. The method further includes positioning the device 20 such that the first surface 30 of the tubular member 22 is adjacent or abuts one of an inner surface of either the top portion 110 or the vertical portion 112 of the cap portion 106. When positioned according to this method the tubular member 22 is substantially visually obscured by the vertical portion 112 of the cap portion 106. The method also includes coupling the tubular member 22 to the cap portion 106.

Use of the load securing device 20 may be best understood by referring to FIGS. 1 and 2. In use, one or more load securing devices 20 are coupled to one or more sidewalls 104 of the pick-up truck 100. Once attached underneath the cap portions 106 of the sidewalls 104, line or cord 116 can be secured to at least a first attachment member 24 and extended and secured to at least a second attachment member 24 (see FIG. 1) or a load (not shown). In one embodiment, line or cord 116 is secured across a truck bed 104 between attachment members 24 on opposed devices 20 to secure a load during transport (see FIG. 1).

One advantage of the load securing device 20 of the present disclosure is that one or more devices 20, can be configured to span the entire length of one or both sidewalls 104 underneath the cap portion 106. When used in this manner, the load securing devices 20 provide a plurality of tie-down anchors along the entire length of the truck bed for securing a load or multiple loads spanning the entire length of the truck bed.

It should be appreciated that multiple devices 20 may be used in concert for securing loads during transport. For example, as best seen in FIG. 1, two devices 20 can be attached in parallel, with one device 20 on each of left and right sidewalls 104 for cross-bed securing. In addition, for pick-up trucks with longer cargo beds, two or more devices may be attached in series underneath the cap portion of the sidewall (not shown). Two additional devices (not shown) may also be attached to the opposite sidewall for cross-bed securing.

While illustrative embodiments have been illustrated and described, it will be appreciated that various changes can be made therein without departing from the spirit and scope of the present disclosure.

The invention claimed is:

1. A load securing device for a pick-up truck cargo bed, the load securing device comprising:
    (a) a cargo bed sidewall including a cap portion, wherein the cap portion includes a substantially horizontal top portion coupled to the cargo bed sidewall and a substantially vertical portion coupled to the top portion;
    (b) an elongated, square tubular member positioned generally parallel to the top portion and having a first surface and a second surface, the tubular member coupled to the cap portion in a manner that positions the first surface of the tubular member adjacent an interior surface of the cap portion on one of either the top portion or the vertical portion, wherein the tubular member is substantially visually obscured by the cap portion from a top view point of the cap portion; and
    (c) at least one attachment member extending from the second surface of the tubular member to provide a tie-down anchor.

2. The load securing device of claim 1, further comprising a fastener extending at least partially through the tubular member to couple the tubular member to the cap portion.

3. The load securing device of claim 1, further comprising a cord secured to the at least one attachment member and extendable to a load.

4. The load securing device of claim 1, further comprising a cord secured to the least one attachment member and extendable to a second attachment member.

5. The load securing device of claim 1, wherein the tubular member is coupled to the cap portion in a manner that positions the first surface of the tubular member to abut one of either the top portion or the vertical portion of the cap portion.

6. The load securing device of claim 1, wherein the tubular member is sized and configured to have an interference fit within a portion of the cap portion.

7. A load securing device for a pick-up truck cargo bed, the load securing device comprising:
    (a) at least one cargo bed sidewall including a cap portion, wherein the cap portion includes a substantially horizontal top portion coupled to the cargo bed sidewall and a substantially vertical portion coupled to the top portion;
    (b) an elongated, square tubular member positioned generally parallel to the top portion and having a first surface and a second surface, the tubular member sized and configured to fit within a portion of the cap portion, the tubular member coupled to the cap portion in a manner that positions the first surface of the tubular member adjacent an interior surface of the cap portion on one of either the top portion or the vertical portion, wherein the tubular member is substantially visually obscured by the cap portion from a top view point of the cap portion; and
    (c) a plurality of attachment members extending from the second surface of the tubular member and providing a plurality of tie-down anchors.

8. The load securing device of claim 7, further comprising a fastener extending at least partially through the tubular member to couple the tubular member to the cap portion.

9. The load securing device of claim 7, further comprising a cord secured to a first of the plurality of attachment members and extendable at least from the first attachment member to a load.

10. The load securing device of claim 7, further comprising a cord secured to at least one of the plurality of attachment members and extendable from a first attachment member to a second attachment member.

11. The load securing device of claim 7, wherein the tubular member is coupled to the cap portion in a manner that positions the first surface of the tubular member to abut one of either the top portion or the vertical portion of the cap portion.

12. The load securing device of claim 7, wherein the tubular member is sized and configured to have an interference fit within a portion of the cap portion.

13. A load securing device for a pick-up truck cargo bed, the load securing device comprising:
    (a) a cargo bed sidewall including a cap portion, wherein the cap portion includes a substantially horizontal top portion coupled to the cargo bed sidewall and a substantially vertical portion coupled to the top portion, wherein the substantially vertical portion is spaced from the cargo bed sidewall and substantially parallel to the cargo bed sidewall;
    (b) an elongated tubular member positioned substantially parallel to the top portion and having a first surface and a second surface, the tubular member coupled to the cap portion in a manner that positions the first surface of the tubular member adjacent an interior surface of the cap portion on one of either the top portion or the vertical portion, wherein the tubular member is substantially visually obscured by the cap portion from a top view point of the cap portion; and
    (c) at least one attachment member extending from the second surface of the tubular member to provide a tie-down anchor, wherein the at least one attachment member is substantially visually obscured by the cap portion from a top view point of the cap portion.

* * * * *